No. 885,528. PATENTED APR. 21, 1908.
W. S. RUSH.
MOTION INDICATOR AND RECORDER.
APPLICATION FILED JAN. 23, 1907.
3 SHEETS—SHEET 1.
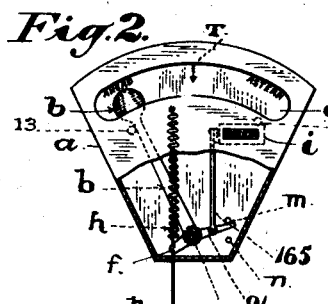
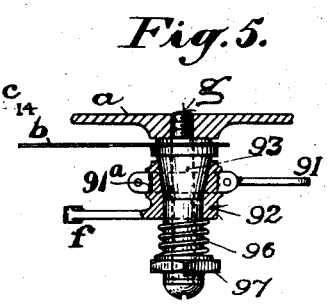
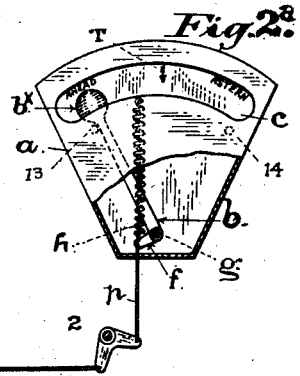
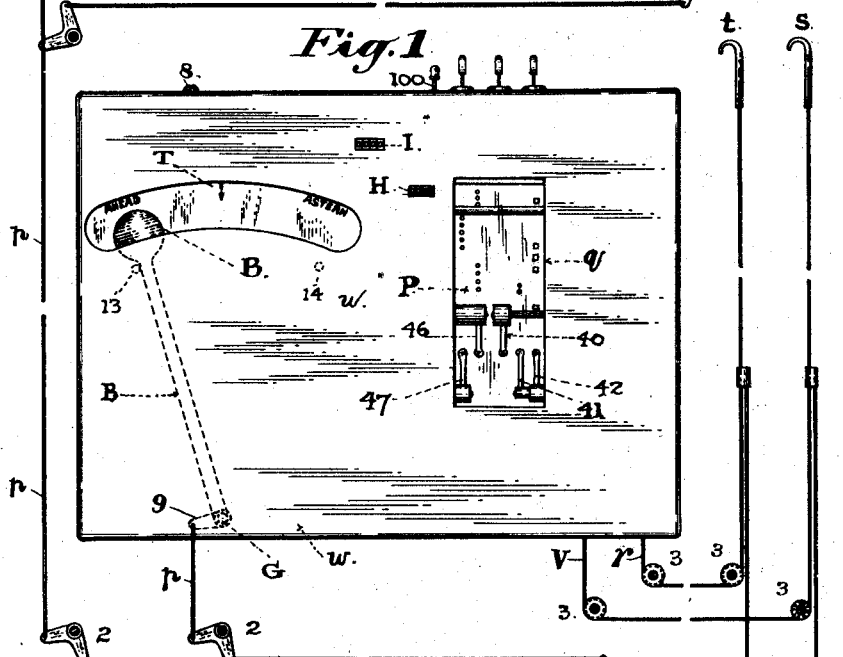
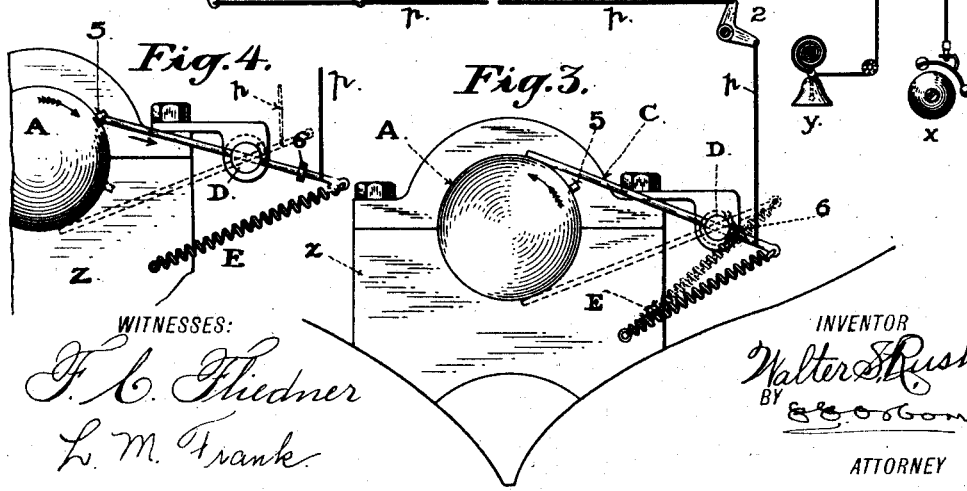
WITNESSES:
F. C. Fliedner
L. M. Frank
INVENTOR
Walter S. Rush
BY
E. C. Osborn
ATTORNEY

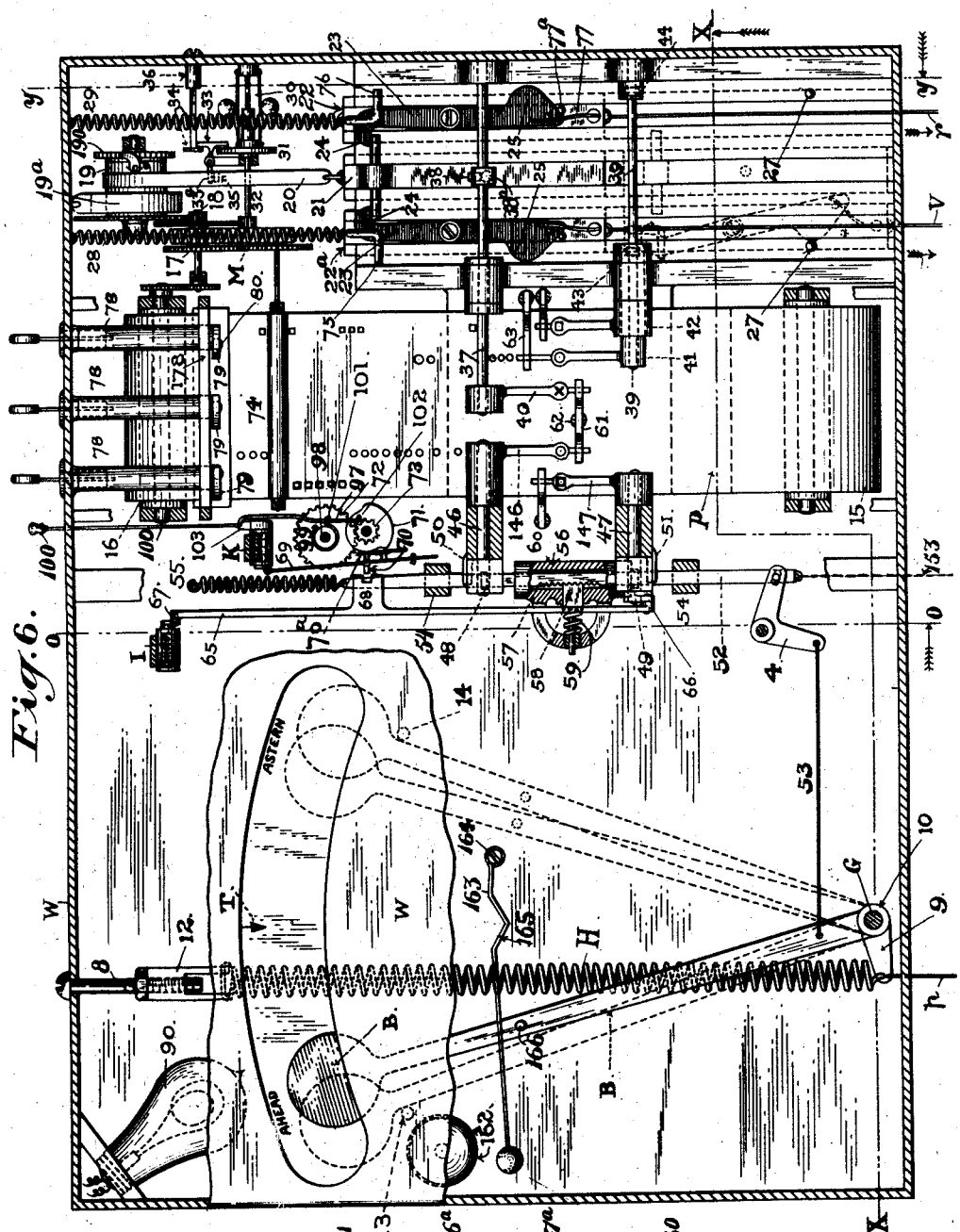

No. 885,528. PATENTED APR. 21, 1908.
W. S. RUSH.
MOTION INDICATOR AND RECORDER.
APPLICATION FILED JAN. 23, 1907.
3 SHEETS—SHEET 3.
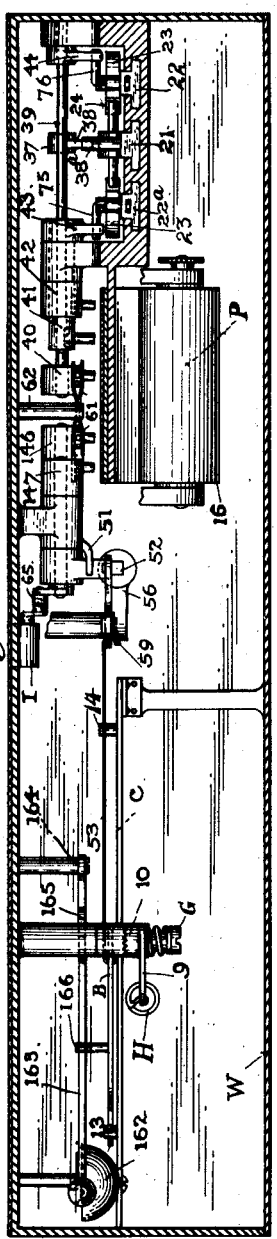
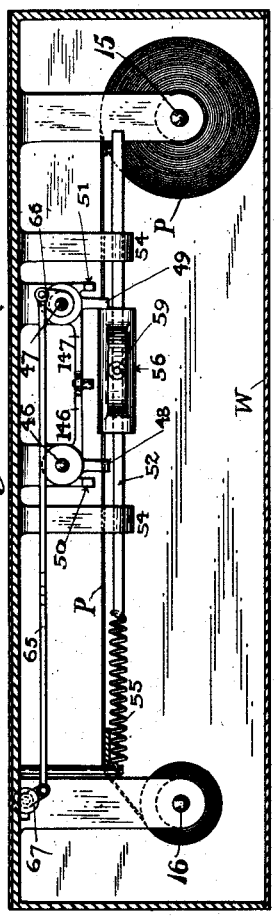
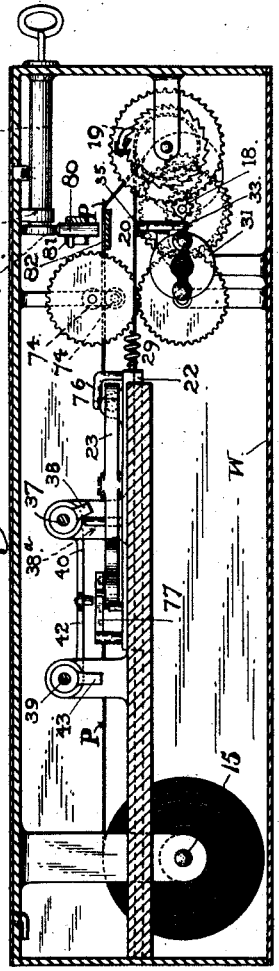
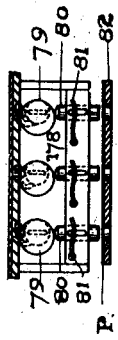
WITNESSES:
F. C. Fliedner
L. M. Frank
INVENTOR
Walter S Rush
BY
E E Osborn
ATTORNEY

UNITED STATES PATENT OFFICE.

WALTER S. RUSH, OF SAN FRANCISCO, CALIFORNIA.

MOTION INDICATOR AND RECORDER.

No. 885,528.　　　　Specification of Letters Patent.　　Patented April 21, 1908.

Application filed January 23, 1907. Serial No. 353,720.

*To all whom it may concern:*

Be it known that I, WALTER S. RUSH, a citizen of the United States of America, resident of the city and county of San Francisco and State of California, have invented new and useful Improvements in a Motion Indicator and Recorder, of which the following is a specification.

This invention has for its object to provide a means or device that will indicate the rotations and the direction of motion of a shaft or other part deriving its movement from an engine, or motor, and will also produce a record of the changes made, both in the direction of the motion of the shaft, or part being actuated, and also the variations in the speed, as the changes take place.

A further object of the invention is to produce a means for making a record of the signals or orders given to the engineer, and for recording the movements of the shafting or other part whose movements should be recorded, as often as the movements are changed or varied in obedience to the signals transmitted.

A complete indicator and recorder of my invention when connected for operation with the engine of a vessel will indicate the direction in which the engine is turning and the vessel is being driven, whether ahead or astern; it will indicate also the direction in which the engine is moving and the relative speed at which it is moving, and whether it is in motion, or at rest. As a recording-device, the invention will make a record of the changes taking place in the speed and in the direction of the motion, and the intervals or periods of rest or "no motion" of the engine. It will record the character of the signals transmitted to the engineer from the pilot-house, and the time as well as the sequence of the signals made during the run of the engine. A complete indicator and recorder of my invention also will indicate the total number of revolutions made by the engine during the entire run of the vessel; and the number of revolutions being made by the engine during a given portion of time; as, for example, the number of revolutions per minute. It will furnish also a permanent record of the signals or orders given to the engineer, and the order in which they were given; and it will record the changes made in the movements of the engine in response to the orders as well as the moment at which the changes or variations were made after the signal was received by the engineer. It will also notify the pilot by an audible signal the instant at which the engine begins to make a reverse movement of the shaft in response to an order transmitted from the pilot-house.

A motion-indicator and recorder of my invention consists of the various parts and features and combinations of features and details of construction hereinafter described and set forth in the claims at the end of this specification.

The accompanying drawings to which reference is made in the following description, illustrate a motion-indicator and recorder of my invention, and the details of its construction.

Figure 1 is a front-elevation of a complete indicator and recorder of my invention, illustrating the means connecting the indicating and recording devices with, and operating them from, the movements of the propeller-shaft of a vessel and from the bell-pulls or signaling means located in the pilot-house. Figs. 2 and 2ª are front views of additional indicating-devices located in different parts of the vessel and connected with a single recording device. Fig. 3 is an end-elevation of the engine-driven shaft, and the mechanism through which the motion of the shaft and the changes in the direction of the motion are caused to actuate the indicating and recording devices. Fig. 4 is a similar detail-view of the mechanism seen in Fig. 3, illustrating the relative position of the parts at the time the engine is starting to rotate in the opposite direction to that represented in Fig. 3. Fig. 5 is a detail top-view, on an enlarged scale, showing the construction of the frictional joints and bearing of the parts connecting the actuating means with the indicator-hand and the registering means, the parts being shown partly in section. Fig. 6 is a front-elevation, on an enlarged scale, of the complete indicator and recorder and its inclosing case, with the removable front-plate and the skeleton frame of the case broken away in part to expose more clearly to view the parts behind. Fig. 7 illustrates a modification of the recording mechanism, showing in side-view the means for operating printing-devices in place of the punches or perforating-devices that are employed in the mechanism represented in Fig. 6. Fig. 8 is a transverse section on the line $x$—$x$ Fig. 6, looking from the underside. Fig. 9 is a longitudinal section on the line o—o, Fig. 6, from the left side of the section-line. Fig. 10 is a transverse section on the line y—y, Fig. 6, from the right of the section-line. Fig. 11 is a transverse section on the line z—z, Fig. 6, looking from beneath, and showing in detail the ends of the lock-barrels and recording-devices combined with the locks for making a record every time the case is unlocked to give access to the mechanism.

The motion-indicating device in this invention consists of a hand mounted or arranged for vibratory movement at a sight-opening, and connected therewith a means for imparting a vibratory movement to the hand from the engine-driven shaft, whereby the hand is caused to vibrate in harmony with the revolutions of the shaft, the said vibrating means operating also to change the working position of the vibrating hand from one side of the center of the sight-opening to the opposite side thereof, as often as the engine is reversed and the driven shaft is caused to revolve in the opposite direction to that in which it was moving.

In the complete mechanism illustrated in Fig. 1 the motion indicating-device is combined with a recording-device, through the medium of which a record is obtained for future reference of the motions and the changes taking place in the direction of the motions of the shaft. This additional feature of a recording mechanism increases the advantages derived from the use of the motion-indicating device, by furnishing a permanent record both of the relative speed of the engine-driven shaft and of all variations in the speed as the same take place either in the forward or backward rotations of the shaft, and of all reversals made in the direction of the motion.

In the complete indicating and recording device of my invention illustrated in Fig. 1 the various parts and mechanism are inclosed for convenience in a single case W, the removable front-plate w of which is secured in place by a locking-device having by preference three separate lock-barrels of such character that the operation of the three separate keys is necessary to unfasten the front-plate and gives access to the mechanism inside the case.

The case W contains, as will be hereinafter more particularly described, a single strip or sheet upon which are made, not only records of the movements of the engine or other apparatus whose movements are to be recorded, and of signals from the pilot or other person who may direct the movements of the engine, but also a record of the opening or attempted opening of the case in which the record sheet is contained. The advantage of this is apparent, as thereby the sequential relation of the opening or attempted opening of the case with reference to any particular record of signals given and of responses thereto in the movements of the engine is shown.

Let it be supposed that an accident has occurred and there is dispute as to the record shown on the strip or sheet, a claim being made that the record has been tampered with and altered. If the record shows that after the accident the case had been opened—this being shown by the lock-record—there might be color to the charge of tampering; whereas, if the record should show that the case had not been opened at all, until, let it be supposed, the arrival in port, and in the presence of disinterested witnesses, then the presumption that the record was true and unaltered would be conclusive.

With each lock-barrel, or the parts of the lock that are actuated by each key, is combined a recording-device comprising a punch or marking device the construction and operation of which will be described with reference to Figs. 6 and 11. A stationary die-plate 82 situated behind or on one side of the bottom-plate 178 of the lock-barrels 78 forms a support for the record-strip P in which perforations are made on every rotation of the lock-barrels when the keys are inserted and the lock-mechanism is operated. At each lock-barrel is arranged a punch 80 having one end bearing against the face of an eccentric disk 79 so fixed on the end of the lock-barrel 78 that in the rotation of the lock-barrel the punch 80 will be pressed against the paper-strip lying behind the cutting end of the punch and a record made thereon. A spring 81 holds the head of the punch in contact with the disk 80, as seen in Fig. 11. This recording-attachment at the lock prevents the case from being opened without a record being made of the same, and the use of more than one locking-device puts a check on any unauthorized access to the recording-mechanism.

Usually the recording-mechanism is contained in the same case with the motion-indicator, but the general construction of the parts is such that the indicator can be arranged in a separate case capable of being placed in a different position or in a different situation. And where additional indicators may be necessary or convenient in different locations in the vessel they can readily be connected for operation with the same actuating mechanism at the shaft. I have illustrated two such additional motion-indicators at Figs. 2 and 2ª, connected with the same mechanism at the shaft A which actuates the indicator and recorder illustrated in Fig. 1. The indicator-hands b b× in Figs. 2 and 2ª are the counter-parts of the hand B seen in Fig. 1, and being connected with the same bar C at the engine-driven shaft, it will be evident that each indicator will show by the vibrations and by the changes in the working position of its hand to one side or the other of the center of the sight-opening, both the condition existing at the engine-driven shaft, whether it be in motion or at rest; and at all times also the direction in which the shaft is turning.

The mechanism by which the indicating-hand B (or b) is caused to vibrate from and in harmony with the revolutions of the engine-driven shaft, operates also to change the working position of the hand from one side of the center T of the sight-opening to the opposite side whenever a change in the direction or the motion of the shaft takes place. The vibrating mechanism has the additional function therefore, of shifting or changing the position of the indicating-hand automatically by or from the reversal of the engine-driven shaft.
The construction and operation of the means by which both the vibrations and the change in working position are effected, will be described with reference to Figs. 1, 3 and 4.

The bar C sets across the shaft A and is movable in an arc on a center composed of a rocker-bearing D, in which the bar is also fitted to slip or move longitudinally to a limited extent. The longer arm or member of the bar C on one side of the bearing lies upon or against the shaft A, and in the path of a fixed pin or projection 5 in the shaft.

To the shorter arm or member of the bar C situated on the opposite side of the center D is connected the hand of the indicator, either by a single wire p, or by a line of wires and bell-cranks 2, where the situation of the indicator requires the connecting wires to be turned in different directions. Through these connections the movements of the bar C as it is alternately lifted and dropped by the pin 5 in the revolutions of the shaft A, short vibratory movements are imparted to the hand B of the indicator in harmony with the motion of the shaft. The relative speed of the engine and the fact that it is in motion, or at rest, at any time is exhibited by the indicator B, and the indicator b wherever they are located in the vessel. Instead of being fixed in the bearing D, however, the bar C has a limited movement longitudinally in the hole through which it passes. Such movement in one direction is limited by a fixed collar 6, and in the opposite direction by the coiled spring E, one end of which is attached to the end of the bar C and the other to a fixed point on the bearing Z below the center of motion of the bearing D. Under the tension of this spring E the bar is retained in normal working position with respect to the pin 5, and while the shaft A continues to revolve in a forward direction, as indicated by the arrow in Fig. 3, the bar lying over the shaft will be lifted and dropped as the pin 5 passes under it. On the other hand, when a reverse motion of the shaft A takes place and it is revolved in the direction of the arrow in Fig. 4, the pin 5 will be carried against the end of the bar C; and, striking that end, it will push the bar longitudinally through the bearing D as the shaft continues to turn backward, with the effect to carry the bar C from its position over the shaft to the position under it, indicated by dotted lines in Fig. 4. The effect of changing the position of the longer member of the bar C from above the shaft to such position below it, and correspondingly changing the position of the shorter member on the opposite side of the bearing D, is to move the hand of the indicator from one side of the center of the sight-opening to a working position on the opposite side; for the reason that the point of attachment of the connecting wires p with the bar C is set above the axis D a sufficient extent to allow the hand B of the indicator to be drawn over to the opposite side of the center T, by the spring H, thereby changing the working position of the hand B from the left to the right side of the sight-opening. With the longer member of the bar C lying against the lower side of the shaft A, therefore, the hand of the indicator will be maintained in working position to the right of the center T, and while retaining that position it will be vibrated by the bar C during the revolutions of the shaft A. On the other hand, on the instant that the motion of the shaft A is reversed the bar C will be brought to the opposite position over the shaft A, and the indicator will be drawn over to the left of the center T by the increased strain thrown on the wires p. It will be seen that the function of the spring E is to hold the bar C against the lower side of the shaft when occupying the position indicated by the dotted lines in Fig. 3, as well as to maintain the bar in position with the collar against the bearing D; whereas the office of the spring H is to keep the connecting wires p under proper tension in both working positions of the bar C and to hold that part down in the path of the projection 5 when the bar is lying over the shaft. The two springs E H, thus maintain the required degree of tension upon the line of connecting wires, and so control the vibrating hand that, under all variations in the length of the wires due to stretching, or to expanison and contraction of the metal, the relative position of the hand in either adjustment to one side or the other of the center will remain the same. Provision is made for regulating the tension of the spring H by attaching one end to a nut 12 working on a screw. A vibrating mechanism of this construction has the advantage of producing both the vibrations of the indicating-hand and its adjustment or change or working position, directly from the revolutions of the shaft and in harmony with its motions, through a single line of mechanical connecting means. A novel feature in connection with this motion-indicating device consists in a friction joint or means connecting the hand of the indicator with the wire through which the vibrating mechanism acts on the hand. The object of this part of the invention is to insure the proper working position of the indicating-hand at the sight-opening in either adjustment, and to prevent it from being shifted or thrown out of such position by changes taking place in the length of the connecting wires when exposed to variations in temperature, or such as may be due to the stretching of the wires. This feature of the indicating mechanism is illustrated in Figs. 2, 5, 6 and 8 in which a stud screwed into the front of the case forms the axis or center for the indicator-hand.

The arm 9, Figs. 6 and 8 to which is attached the wire $p$ forms the connection between the hand B and the wire $p$, but instead of fastening the arm 9 to the hand B in a rigid manner it is connected to the hub on the end of the hand B by a friction-clutch 10, of any well-known construction, fitted to turn on the stud G. A construction of friction-clutch specially adapted for the purpose is illustrated in Figs. 2 and 5, the same comprising a tubular male member 93 to which the hand $b$ is fixed, and a sleeve or female member 92 rotatable thereon and about the stud $g$.

The arm $f$ which corresponds to the arm 9 in Figs. 2 and 5, is formed as a part of, or is fixed to the sleeve 92 and the last mentioned part surrounds the tubular member 93, the portion over which it is fitted being of conical shape to obtain the required friction between the two parts. A coiled spring 96 surrounding the cylindrical portion of the tubular member, and interposed between the sleeve 92 and a threaded nut 97 on the cylindrical portion, presses the sleeve back upon the conical member, producing the proper degree of friction to cause the hand $b$ to move with the arm $f$ in the vibrating movement of that part. In the event of a change in the angular position of the arm $f$ (or 9), however, under any variations taking place in the length of the connecting wires, the frictional coupling allows the hand to adjust itself, or the arm to move upward or downward without affecting the position of the hand. The function of the stops 13 14 on the left side and on the right side of the case is to limit the throw of the hand in its change of position from one side to the other of the center of the sight-opening in the changes taking place in the position of the bar C at the engine-driven shaft. When the parts are properly adjusted the hand $b$ will be brought against the stop 14 by the tension of the spring $h$, as often as the bar C is set for operation below the shaft A; or, at the following reverse-motion, the bar C being set in the opposite position overlying the shaft, the additional strain, or tension thrown on the wires $p$ will bring the hand $b$ over to the opposite side and against the stop 13. The stops 13 and 14 are situated such distance apart, and in such relation to the indicator and to the sight-opening through which the indicator is seen, that the latter, when against one or the other stop is at its extreme limit of movement, either to the right or to the left. The distance between the stops should be a little less than the distance that the indicator, should it be free to move, will be shifted by the connections that operate it thus allowing for the resetting or readjusting of the indicator, in the manner already described, whenever this may be necessary by the changing tension upon the line of motion-transmitting connections or for other reasons. The relative working positions of the indicating-hand during its vibratory motions to one side or the other of the center of the sight-opening are thus always the same, whether it be set on the left, or on the right side of the center T.

In combining a counter or register with this indicating-device, to register the number of vibrations made by the hand during a given period, the same is connected as illustrated in Fig. 2, by providing an arm 91 on the friction sleeve 92, to which a register of any well-known construction is connected by a rod 165, one end of which is attached to the arm, and the other end to the actuating shaft or other member of the units-wheel of the register. The stops $m-n$ on opposite sides of the arm 91 control the position of that part in the movement of the hand $b$ from one side of the center of the sight-opening to the opposite side. In such adjustment the friction-clamps 91ᵃ by which the arm 91 is secured on the sleeve 92 will allow the arm to slip when the hand is shifted to the opposite side of the center; but under the ordinary vibratory motion of the hand, as it is acted on by the arm $f$, the friction between the parts that fasten the arm 91 to the friction-sleeve will so connect them together that the register will be acted on by the vibrations without loss of motion due to slip of one part on the other.

The recording mechanism of my invention furnishes a permanent record of all the movements of the engine-driven shaft. It also makes a record of all the signals given to the engineer from the pilot-house, or other part of the vessel; recording both the character of the various signals, and the order in which they are transmitted. In the present construction of this recording mechanism the two sets of records, those relating to the motions of the mechanism whose movements are being recorded, and those recording the signals or orders, are made at intervals on a movable band or strip of paper P, that is carried along under separate sets of punches, or markers, by means of clock-work connected to one of the rolls. In the embodiment of my invention illustrated in the drawings of this case one set of these recording-devices is connected with the "pulls" s—t of the pilot's signaling apparatus; the other set is connected with and operated by the mechanism that also vibrates and shifts the indicator-hand B in the sight-opening.

The preferred kind or description of recording-device here employed makes a record by punching holes in the paper. Other forms or kind of recording-devices constructed to imprint or mark characters on the paper can be substituted for punches, however, as either kind of recording-device can be operated by the same mechanism.

The signal-operating means and the recording-mechanism combined with it will be described with reference to Figs. 2, 6, 7, 8, 9, 10.

A slide-bar 22$^a$ movable in a guide-slot as seen in Figs. 6 and 8 and connected with the bell-pull s by wire v, is arranged to travel once up and down every time the handle is pulled to give a signal on the gong x. A coiled spring 28 attached to the slide 22$^a$ brings it back to the starting-point when the handle is released. A similar slide 22, connected with the pull-handle t of the other signal y by the wire r, and arranged to move in guide-slots parallel to the slide 22$^a$, is drawn back to position by a spring 29. The construction and operation of these two slides and their manner of operating the recording-devices are alike. Each slide carries a latch-bar 23 pivotally attached to it, having on one end a hook 24, and on the opposite end a laterally-projecting head with an inclined edge 25 setting at an angle to the direction of travel of the slide. This latch 23 on each of the two slides 22—22$^a$ has the function of winding up the clock-work that moves the record-strip P. On the same slides are mounted tripping pins 75—76, that operate the signal-recording devices in every downward movement of the slides 22—22$^a$.

The winding-mechanism consists of a strap 20 attached at one end to a draw-bar 21, and made fast at the other end to a drum 19 which is connected with the spring-barrel of the clock-work by a pawl and ratchet wheel 190. The arbor of the spring-barrel is connected by a train of gears 17—18 with the axle of the roller 16 on which the record-strip P is wound; and a pair of feed rolls 74, one above and the other beneath the record-strip, are connected with the same power by gears M. The record-strip is thus drawn from the lower roll 15 by the rolls 74, and is taken up by the upper roller 16 at a uniform rate of travel.

In the movement of either slide 22 or 22$^a$, as it is drawn down by the pull-handle, the hooked end 24 of the latch will engage the cross-pin in the head of the slide 21 to which is attached the strap 20, and drawing that part down with it will wind up the spring-barrel 19. Sufficient power is thus stored up to set the record-strip moving and keep it in motion for the required length of time to make a record of the signals and of the movements of the engine made in response to the signals. Usually a period of five minutes will be found ample duration for the movement of the record-strip to continue after the signal, and the present clock-work mechanism is designed to set the record-strip in motion and keep it moving for that length of time. It should be understood, however, that such periodical movements of the record-strip can be varied in length, and that the invention is not necessarily confined or limited to the feature of operating the recording-devices and keeping the record-strip in motion within any particular duration of time immediately following a signal. It is important, however, that in producing for future reference, both a record of the signals transmitted to the engine-room and of the movements of the engine made in response to such signals, there should also be provided some means of recording both the time when the signal was transmitted, and the moment when the direction in the movements of the engine was changed or modified in response to the signal; for if the record-strip should be caused to travel for an indefinite length of time after the signals are given, without the interval of time occurring between the production of the signal and the change made in the motion of the engine in response thereto being definitely recorded, there would be no check on the engineer on the one hand; and no means of determining beyond dispute on the other hand whether a signal had been properly given from the bridge or pilot-house, and had been properly and promptly obeyed in the engine-room. The means provided for that purpose in connection with this recording mechanism consists of a recording-device actuated directly by or from the winding-slide 21 and operating to mark the record-strip in every complete return of the slide to its initial position as the clock-spring 19$^a$ runs down, and the strap 20 on the spring-barrel 19 is wound up. This record is made only when the slide 21 has been released from the latch 24 and has completed its upward movement to the starting-point.

In every movement downward the slide 21 is locked by the latch to that one of the slides 22 or 22$^a$ which is connected to the pull-handle being operated at the time, and is drawn down with that slide; but at the end of its downward travel the incline 25 on the lower end of the latch strikes a fixed stop 27 on one side of the guide-slot, and throwing off the hooked end 24 from the cross-pin, it releases the slide 21, which is thereupon drawn back to position as the clock mechanism runs down.

Every complete rewinding of the strap 20 on the spring-barrel following the preceding period of movement of the record-strip is marked on the record-strip by the punch or marker 40. This part is fixed on a rock-shaft 37, extending over the stationary guide-plate that carries the slides 21 22 22ᵃ. Motion is imparted to the rock-shaft 37 by a toe 38 on the shaft, and an abutment 38ᵃ carried by the slide 21, which in the return-movement of the slide under the recoil of the spring operates to strike the toe 38 and bring the record-arm 40 down against the record-strip P. A forked-spring 61 holds the arm 40 in neutral position horizontally over the record-strip, the same being composed of two tongues confining between them an extension-pin on the end of the arm 40, and serving to bring the arm back to a neutral position clear of the record-strip, both after the abutment 38ᵃ has passed under the toe 38 in the downward movement of the slide, and also when the abutment 38ᵃ brings the recording-arm 40 against the record-strip by striking the toe 38.

The records made of the signals are produced from the movements of the slides 22—22ᵃ as often as either one is drawn down by the pull-handle to which it is connected. The records which they make on the record-strip always precede the record made by the marker 40, which is actuated by the slide 21 when that part has returned to its starting-point. The marker 41 is fixed on a rock-shaft 39, from which an arm 44 extends in the path of the pin 76 on the upper end of the slide 22, so as to be struck and pressed back as the slide 22 is drawn downward. A spring 77 controls the latch 23 in such manner that the spring 77 will yield and permit proper lateral movement of the latch to throw the hooked end 24 clear of the slide 21 when the latch is brought in contact with the fixed stop 27 on the stationary guide-plate. The same description applies to the parts that operate the marker 42 which is operated by the slide 22ᵃ connected with the pull-handle s. The toe 43 extending in line with the pin 75 on the end of the slide 22ᵃ is fixed on a short tubular shaft surrounding and turning separately of the shaft 39, and the marker 42 stands parallel with the marker 41 carried by the shaft 39. Both arms 41—42 are also returned to a neutral position after every movement by the forked spring 63, arranged in the same manner as the spring 61 that controls the marker 40 before mentioned.

The movement of the clock-work both in starting and in stopping is regulated and determined by an automatic brake and releasing-device, constituting a governor, the construction and operation of which will be described with reference to Figs. 6 and 10.

On the shaft 32 of the clock-movement is a disk 31, movable longitudinally on the shaft by the governor, to the arms 30 of which the disk is connected. While rotating with the shaft 32 this disk is caused to bear against a friction-lever 33, as the centrifugal force acts on the governor-balls, and the frictional resistance which is set up by the fixed head 33, controls the rotation of the shaft that carries the disk. The part 33 being composed of a cross-head 33 and an arm 33ᵃ at right angles to the cross-head, is so mounted in relation to the disk 31 and to an adjustable stop 34 that when the centrifugal force acting through the governor-balls causes the disk 31 to bear against one limb of the cross-head 33, the opposite limb will be pressed against the stop 34, with the effect to set up a resistance to the rotation of the disk that will increase in proportion to the speed of the shaft 32. The lever 33 is pivotally mounted on a stationary support, and the stop 34, which forms the fulcrum for the lever is rendered adjustable from the outside of the case by being mounted on the end of a screw rod 36, the head of which is situated outside the case. The end of the arm 33ᵃ projects in the path of a stop 35 on the back of the winding-strap which by contact with the arm arrests the further movement of the disk 31 and stops the clock-movement at the end of each recording operation.

As the slide 21 returns to place in every complete rewinding of the strap 20, it prevents further movement of the record-strip P by putting on the brake; thus holding the record-strip at rest until the next operation of the recording-mechanism when the signals are operated again and the slide 21 is drawn down. In every complete rewinding of the strap 20, as the stop 35 comes in contact with the lever 33ᵃ, the head 33 is brought against the disk 31 with sufficient force to arrest the shaft 32 and stop the clock-movement.

The recording-device 40 is arranged to be actuated in every complete period for which the clock-work is set to run by a single winding, so as to make a record on the paper-strip only when the bell-pulls are not operated again and signals are not transmitted to the engine-room within the period for which the record-strip is set in motion and caused to travel by one winding operation of the clock-work. The record made by this recording-device 40, therefore, marks the time when the clock-work has run down and the record-strip has ceased to move after the last signal given to the engineer; and by the location on the record-strip of the perforations or other indicating marks made by the other recording-devices 146—147 with relation to the record made by this device 40, the lapse of time or interval between the transmission of a signal by either bell-pull and the movements of the engine in response to the signal is marked on the record-strip by the part 40, and is readily read and determined from the record.

The punches or markers 146 and 147 that record the motion of the shaft and its change of position may be operated from the movements of the motion-indicating means, as illustrated in Figs. 6, 8 and 9.

The slide-bar 52 being connected directly to the hand B through a wire 53 and a bell-crank 4, is reciprocated in harmony with the revolutions of the shaft A and the movements of the hand. The bar 52 may be actuated also in another way by connecting it directly to one of the wires $p$ running to the bar C at the shaft A, as by a wire 153 carried from the end of the bar 52 through the bottom of the case, and thence to the bar C. This connection is indicated by dotted lines in Fig. 6. A coiled-spring 55 attached to the opposite end of the slide-bar 52 maintains proper tension on the connecting wires to keep the bar 52 moving in harmony with the hand B and shaft A. The spring 55 also takes up the slack in the connecting wires due to contraction or expansion. It also maintains the wires in proper tension as the working position of the hand B is changed from one side to the other of the sight-opening. Upon the bar 52, which, as described, moves in consonance with the shaft or other part whose motions are to be indicated or recorded, is mounted a yielding contact device, designated as a whole by the numeral 56, through which the motions of the bar are communicated to the markers. In order to permit the bar 52 to have a longer throw or movement than is required to properly bring it into operative relations with the markers or recording devices it controls, this being necessary because the connections between the shaft and bar may vary in length under different conditions of use, the contact device 56 is yieldingly mounted on the bar and is adjustable therealong, and there are arranged in combination therewith stops which properly set it in correct operative relation to the marking or recording devices. As often as changes take place in the position of the arm B, the bar 52 is moved longitudinally in its bearings 54, bringing the end of the contact device or sleeve 56 in contact with a fixed stop 50 (or 51), and changing the working position of the sleeve 56 on the bar. To permit this longitudinal movement of the bar 52 through the sleeve 56 when the end of the latter is arrested by the fixed stop in front of it, the sleeve is held on the bar 52 by a friction-clutch, comprising a yielding block 58 held against the bar 52 by a coiled spring 59, having a serrated face bearing against a similar surface on the bar, to increase the friction between the parts.

In the short reciprocations of the bar 52 as it moves in harmony with the hand B when the latter occupies the position at the left, the lower end of the sleeve 52 will strike the pin 49 on the rock-shaft 47 that operates the punch or marker 147; in this movement the pressure of the friction-block 58 against the bar 52 is sufficient to lock the sleeve and prevent it from slipping on the bar. But, on the other hand, as often as the hand B is set over to the right, the connecting wire 53, (or 153) will become slack, and under the tension of the spring 55 the bar 52 will have a longer initial movement in the bearings 54, the effect of which will be to first bring the upper end of the sleeve 56 against the stop 50, and thereby arrest and hold the sleeve at that point, but the bar 52 will continue to move and will be drawn through the sleeve as the friction-block 58 will yield under the increased strain on the wires and the bar 52, and place the sleeve in a different position on the bar. In the short reciprocations following this long movement of the bar, as the latter vibrates with the hand B the sleeve will be confined on the bar and its upper end will strike and operate the rock-shaft 46 of the other marker or recording device 146 in each vibrating movement.

In one position on the bar 52, when the hand B is vibrating on the left of the center, the sleeve 56 will strike the pin 49 in every down-stroke of the bar 52, and the line of perforations made by the punch 147 will show that the engine is traveling forward; whereas, in the opposite position of the sleeve 56 on the bar, which it occupies when the indicator B is set over to the right, the bar 52 will carry the end of the sleeve against the stop 48 on the rock-shaft 46, and the vibrations of the hand B will be recorded on the strip P by the second line of perforations made by the punch 146, showing that the engine is backing.

A mechanical register of any well-known kind is connected with the rock-shaft 47, to be operated by that part in time with the punch 147 that records the revolutions of the engine-driven shaft when running forward, for showing the total number of revolutions made by the engine when running forward. The mechanical counter I in Fig. 6 is provided for that purpose, and is connected with the rock-shaft 47 through the medium of the connecting-rod 65 and the crank-arms 66, 67, one on the end of the rock-shaft and the other on the actuating shaft of the counter I. Every record made by the marker 147 on the record-strip will thus be registered at the counter I. An additional register of the same kind can be connected with the rock-shaft 46 and actuated by that part in every movement of the punch 146, so as to register the total number of revolutions made by the engine when running backwards.

In those situations or conditions of use where it may be desirable to ascertain the rate of speed being made by the engine during a given period of time, as for example, during the period of one minute, I provide a separate registering-device, as K, Fig. 6, which I actuate from the rock-shaft 47 at the required moment by temporarily connecting the actuating-shaft of the register K with the rod 65, for the required interval of time, and then automatically stop the register at the end of the period by disconnecting the rod 69 from the rod 65.

The means which I employ to connect and disconnect the registering-device, consists of the rod 69 connected with the actuating shaft of the units-wheel in the register K, and having a hook shaped lower end 70, in line with notches, or recesses, 68 in the rod 65. The two rods 65—69 are locked or temporarily connected together when the hooked end of the rod 69 is pressed into a notch of the rod 65, but a flat spring 70$^a$ bearing against the rim of the disk-cam 71, holds the hooked end of the rod 69 normally away from the notched portion of the bar 65 and keeps the two rods disconnected until by the rotation of the cam 71 when the same is turned by the spring barrel, the rod 69 will be pressed forward, and its hooked end will be set in the notch of the bar 65. As often as the cam 71 is set in motion, its portion of greater diameter acting against the spring 70$^a$ will press and hold the hooked end of the rod 69 in the notch 68 of the rod 65. The two rods 65—69 will then be held together as long as that portion of the cam bears against the back of the spring, and this condition will be maintained until in the continued rotation of the cam, its portion of less diameter will be brought against the spring, whereupon the hooked end of the rod 69 will be withdrawn from the rod 65 by the spring 70$^a$, and the register K will be disconnected. Rotation is given to the cam 71 for a given period of time, as for the space of one minute, by means of a spring-barrel 98, of ordinary construction into which the cam is geared by a spur wheel 99 and a pinion 73.

A pull-rod, or wire, 100 extending through the case to the outside is connected with the spring-barrel by a winding-strap 101, one end of which is attached to the barrel and the other to the rod 100, so that the spring will be wound as the strap is drawn off the barrel. A single pull of the rod 100 will wind and store up sufficient power in the spring-barrel to keep the register K connected with the rod 65, during the period of one minute or other predetermined period after the register is set to run, and the register K will be actuated by the rod 69 for that period of time and no longer. Stop-pins 102 on the side of the cam 71 arrest the cam at the end of a complete revolution by engaging the end of the rod 100 which lies in their path. The position of these parts when at rest and disconnected from the rod 65 is illustrated in Fig. 6. The rod 100 is connected with the throw-off lever of the register K at 103, for conveniently resetting the register back to zero, as often as the rod 100 is pulled to start the spring-barrel for operating the register.

Instead of employing punches or perforating-devices for making the records on the strip P, other means, such as type-bars or similar printing-devices may be used, such, for example, as illustrated in Fig. 7, where the type-bars 146$^a$ and 147$^a$ are actuated by the contact of the sleeve 56 with the pin 149 on the hub of the type-bar 147$^a$, or with the pin 148 on the hub of the opposite type-bar 146$^a$. It will be seen that these two type-bars in Fig. 7 and their operating parts correspond in function to the punches 146, 147 and the parts that actuate them; and that in either construction a record will be made on the paper P from the reciprocating movements of the bar 52.

The addition of a signal-bell to the motion-indicator as shown in Fig. 6, operating to give an audible signal in every change taking place in the working position of the hand B, will be found a great convenience under many conditions of use. This attachment is readily placed inside the case in such position that the hand B will operate a striker 163, and produce an audible signal every time the hand B is thrown over the center from either side. The striker-rod 163 is a spring-rod fixed at one end 164, and provided with an angular offset 165 projecting in the path of a pin 166 on the hand B; the striker on the free end of the rod 163 being arranged in close relation to the gong 162 to strike the same every time the pin 166 lifts and drops the rod 163.

Every change in the motion of the engine from "ahead" to "astern," or in the reverse direction to which it was previously moving, is thus made known to the pilot by the signal sounded on the bell at the instant that the change in the motion takes place, without the necessity of looking at the indicator to ascertain the same from the position of the hand at the sight-opening.

The connecting mechanism through which the indicating and recording mechanisms receive their movements from the engine shaft or other part whose movements are being recorded, illustrated and described in this case are not herein claimed but are presented and claimed in my application, Number 370,874, filed April 29, 1907.

I am aware that it has been proposed to make a record of the movements of a ship's shaft by means of apparatus comprising a recording marker adapted to trace a line upon a record sheet, a centrifugally operating device similar to a centrifugal ball governor on an engine connected with and moving the marker, and driving connections between the shaft and the said centrifugal governor device; and I desire to be understood as not claiming such an apparatus as that referred to. In such proposed apparatus, the connection of the recording device or marker was directly with the centrifugal governor, and not directly with the shaft whose movements it was intended should be recorded. It would follow that in using such a device the record made would be a record of the governor or centrifugal device, which, as is now well understood, can not be depended upon at sea since the rolling of the ship will cause it to move independently of the movements that it receives from its connection with the shaft or engine, and hence the record that would be made would not be an exact record of the shaft's movements. On the other hand, by means of my apparatus the record corresponds exactly with the movements of the shaft.

Having fully described my invention, what I claim is:

1. In a motion-indicator for an engine-driven shaft a hand having vibratory motion at a sight-opening and capable of adjustment as to its working position with relation to the center of the sight-opening, means for vibrating the hand in harmony with the revolutions of the engine-driven shaft and operating in every reversal of the shaft to change the hand from its working position on one side of the center of the sight-opening to a corresponding position in the opposite side thereof, and means operated by the vibrating means for making a record of the vibrations.

2. In a motion-indicator for an engine-driven shaft a hand having vibratory motion at a sight-opening and capable of adjustment as to working position during such vibrations, means for vibrating the said hand in harmony with the revolutions of the shaft and for adjusting the working position of the hand from one side to the other of the center of the sight-opening in every change taking place in the direction of the motion of the shaft, and means operated by said hand-vibrating and adjusting means for making a record of the said changes in the working position of the hand.

3. The combination with an engine-driven shaft, of a hand mounted for vibratory motion at a sight-opening and adjustable as to its working position on one side or the other of the center of said opening, means for imparting vibratory motion to the hand from and in harmony with the revolutions of the shaft, said means operating to set the hand in working position on one side or the other of the sight-opening according to the direction in which the shaft is being driven, a record-strip, and means for making a record of the vibrations of the hand, and separate means for making a record of the changes in the working position of the hand on the same record-strip.

4. In a motion-indicator and recorder for an engine-driven shaft, the combination of a plurality of motion-indicating hands, each separately mounted for vibratory motion at a sight-opening and adjustable as to working position with relation to the center of its sight-opening, means for vibrating all the hands in harmony with the revolutions of the engine-driven shaft and for adjusting all the hands simultaneously to a working position from one side of the center of its sight-opening to the opposite side in every reversal in the motion of the shaft, means for making a record of the revolutions of the shaft as indicated by the vibrations of the hands, and means for making a record of the changes in the direction of the motion imparted to the shaft by the engine, as the same takes place.

5. An apparatus for recording the movements of a ship's shaft, comprising a recording device for directly indicating its revolutions in one direction, a device for directly indicating its revolutions in the opposite direction, a contact device for operating the said recording devices, and connections between the contact device and the shaft to shift it to a position for operating one of the recording devices when the shaft turns forward, and for operating the other when it turns in the reverse direction.

6. In a device for recording the movements of an engine-driven shaft, the combination of a hand, means for directly connecting the hand with the shaft and arranged to impart to the former vibratory movements in consonance with the revolutions of the latter, means operating to make a record of the vibrations of said hand, a signal-operating device, and means for making a record of the signals transmitted by the said signal-operating device.

7. In an apparatus for recording the movements of the shaft of a ship, the combination of a signal-giving means, means for making a record of the signals transmitted thereby, a support for a sheet upon which the said record is made, vibratory means for recording the revolutions of the ship's shaft upon the same sheet as that recording the signals given and in sequential relation thereto, and means directly connecting the ship's shaft and the devices that record its revolutions, whereby an accurate record of the shaft's revolutions is made.

8. In a ship's recording apparatus, the combination with a ship's shaft, of a support for a strip or sheet on which the records are made, means for transmitting signals between the pilot and the engineer, means for recording on the said strip or sheet the signals received by the engineer, connections for operating the said recording means connected with the signal-operating means at points near the engineer's signals, vibratory means for recording on the said sheet, and in sequential relation to the other records, the revolutions of the shaft, and direct connections between the shaft and the last said recording means, substantially as set forth.

9. In a motion-indicator and recorder, the combination of means directly connected with the shaft and arranged to make records in consonance with the revolutions of the shaft, means for making a record of the changes in the direction of motion of the shaft, a signal-operating device for transmitting signals to go ahead, a second signal-operating device for transmitting signals to reverse the engine, and a series of independent recording marking devices for making separate records of said signals.

10. In a motion-indicator and recorder for an engine-driven shaft the combination of a hand pivotally mounted behind a sight-opening, means for imparting vibratory motion to said hand from the revolutions of the engine-driven shaft and in harmony therewith, means for setting the vibratory hand in one position at the sight-opening when the shaft is rotating forward and in another position when the engine is reversed and the shaft is being rotated backward, means for making a record of the vibrations of the hand in either position, means for making a record of the changes in the working position of the vibrating hand, a signal-operating device for transmitting signals to go ahead and signals to reverse the engine, and means actuated by said signal-operating devices for marking records of the said signals in the order in which they are transmitted.

11. In a motion-indicator and recorder for an engine-driven shaft, the combination of a record-strip, means for recording thereon the revolutions of the shaft, means for recording the changes made in the direction of revolution of the shaft, signal-operating devices for transmitting signals to control and change the movements of the shaft, means for making a record on the record-strip of the said signals in the order in which they are transmitted, means for imparting motion to the record-strip for a predetermined period of time, and means for recording on the record-strip the termination of its motion.

12. In an organized mechanism for indicating and recording the movements of an engine-driven shaft on a vessel, a visual indicator, means for vibrating it in harmony with the revolutions of the shaft, means for transmitting orders to the engine-room, a record-strip, means actuated by the order-transmitting means for imparting motion to the record-strip, means for determining and controlling the duration of such motion, means for making a record of the movements of the visual indicator, and means for recording on the record-strip the operation of the order-transmitting means at the moment of its operation.

13. In an apparatus for recording the movements of an engine-driven shaft of a vessel, the combination of a support for a record strip, means for imparting motion thereto for a predetermined time, means for recording on the strip the orders transmitted to the engine room, means for setting in motion the record strip-moving means whenever an order is transmitted, and means for directly recording on the strip the movements of the engine shaft, substantially as set forth.

14. In an apparatus for recording movements of an engine driven shaft, the combination of a case, a record strip mounted therein, means for recording upon the strip the signals transmitted to the engine room, means for recording directly upon the strip the movements of the ship's shaft in their sequential relation to the signals given, locking means for closing the case, requiring the use of a plurality of keys to release or unlock the same, and separate recording means operated by the different keys when used in the lock arranged to make records on the said strip in sequential relation to the other records whenever the lock is operated by a key, substantially as set forth.

15. In an apparatus for making a record of the working of a marine engine, the combination with the shaft, of reciprocating mechanical connections moving in consonance with the revolutions of the shaft, a device for making a record of the movements of the shaft, motion transmitting means adapted to be brought into working engagement with the said reciprocating connections at will, a timing device for automatically disengaging the said connections after they have been in engagement a determined length of time, and means for setting the timing device when the said engagement is made, substantially as set forth.

16. In an apparatus for making upon a movable strip a record of signals given an engineer from a distant point, the combination of means for moving the strip arranged to operate a predetermined length of time for each complete winding, devices for making a record of the signals given to the engineer, and means for winding up or storing power for operating the said mechanism whenever a signal is given, whereby after each signal the strip moving mechanism will be set to move the strip a definite distance, substantially as set forth.

17. In an apparatus for making upon a movable strip a record of signals given to an engineer from a distant point, the combination of the strip moving mechanism arranged to move the strip a predetermined distance for each complete cycle of movements of the said moving device, means for making a record of the signals on the strip, means for setting the parts of the strip-moving device to a position to commence a cycle of movements, these means being arranged to reset the parts whenever a signal is given, and means for stopping the strip-moving device when they have completed a cycle of movements, whereby the strip will always be moved a definite distance after the last signal given before it is stopped, substantially as set forth.

18. In an apparatus for making upon a movable strip a record of signals given to an engineer by the pilot of a ship from a distant point, the combination of strip-moving devices, devices for making records on the strip, an engineer's sounding signal, a pull, a single line of mechanical connections extending from the pull and branching at a point distant from the pull, one branch leading to the sounding signal and the other to the record making devices, and means for maintaining the said connections under proper tension, substantially as set forth.

WALTER S. RUSH.

Witnesses:
EDWARD E. OSBORN,
L. M. FRANK.